United States Patent

Mori

[11] Patent Number: 6,052,175
[45] Date of Patent: Apr. 18, 2000

[54] METHOD FOR MEASURING A DISTANCE

[75] Inventor: Kenichi Mori, Nagano, Japan

[73] Assignee: Fuji Electric Co., Ltd., Kawasaki, Japan

[21] Appl. No.: 09/123,361

[22] Filed: Jul. 28, 1998

[30] Foreign Application Priority Data

Aug. 28, 1997 [JP] Japan ..................................... 9-232244
May 21, 1998 [JP] Japan ................................... 10-139786

[51] Int. Cl.[7] ................................ G01C 3/00; G01B 9/04
[52] U.S. Cl. ..................... 356/3.14; 250/201.8; 396/104; 396/121; 396/128
[58] Field of Search ....................... 250/201.8; 356/3.14, 356/3.15; 396/104, 121, 128

[56] References Cited

U.S. PATENT DOCUMENTS 4,107,520  8/1978  Wilwerding .
5,880,826  3/1999  Jung et al. .................................. 356/73

*Primary Examiner*—Stephen C. Buczinski
*Attorney, Agent, or Firm*—Kanesaka & Takeuchi

[57] ABSTRACT

In a method of measuring a distance, an evaluation function indicating a degree of coincidence of a pair of image data projected onto a pair of sensor arrays through a pair of focusing lenses is found, and a ratio of a valley value of a transition graph and a gradient of the transition graph are calculated by using a minimum and least value of the evaluation function and two values of the evaluation function adjacent to the minimum and least value. Then, the distance between the focusing lens pair and an object based on the evaluation function is calculated. Also, reliability of the calculated distance based on the calculated ratio is inspected. Thus, the calculated distance data is accurate and reliable.

4 Claims, 6 Drawing Sheets

In case of OK (focused), a shift amount $(a_{R1} + a_{L1})$ is obtained, and a distance is obtained by formula (3) $y = B \cdot f / a_{R1} + a_{L1})$

METHOD FOR MEASURING A DISTANCE

BACKGROUND OF THE INVENTION AND RELATED ART STATEMENT

The present invention relates to a method for measuring a distance based on a phase-difference detection, which is a basic principle of the auto-focusing apparatus, such as camera.

At first, the conventional principle of measuring a distance will be explained in connection with FIGS. 3 and 4. FIG. 3 is a schematic view for explaining the principle of measuring a distance. FIG. 4 shows a set of image data for explaining the principle of measuring a distance.

Referring now to FIG. 3, an origin O is set at a midpoint between the optical axes of focusing lenses 61 and 62. And, the axis of abscissa X and the axis of ordinate Y are defined as described in FIG. 3. Then, the coordinates of focused image positions $L_1$ and $R_1$ on optical sensor arrays 63 and 64 are expressed respectively by $(-a_{L1}-B/2, -f)$ and $(a_{R1}+B/2, -f)$. Here, $a_{L1}$ and $a_{R1}$ are distances on the respective sensor arrays 63 and 64, and B is the distance between the optical axes of the focusing lenses 61 and 62.

The coordinate of the center $O_L$ of the focusing lens 61 is expressed by $(-B/2, 0)$, and the coordinate of the center $O_R$ of the focusing lens 62 is expressed by $(B/2, 0)$. If the coordinate of a point M on an object 51 is expressed by $(x, y)$, the coordinate of a cross point N of the vertical line drawn from the point M to the X-axis with the X-axis is expressed by $(x, 0)$. The coordinate of a point $L_o$ of the vertical line drawn from a center $O_L$ of the focusing lens 61 on the optical sensor array 63 is expressed by $(-B/2, -f)$, and the coordinate of a point $R_O$ of the vertical line drawn from a center $O_R$ of the focusing lens 62 on the optical sensor array 64 is expressed by $(B/2, -f)$. Since a triangle $MO_LN$ and a triangle $O_LL_1L_O$ are similar, and a triangle $MO_RN$ and a triangle $O_RL_1L_O$ are similar, respectively, the following numerical formulas (1) and (2) are held.

$$(x+B/2)f=a_{L1} \cdot y \quad (1)$$

$$(-x+B/2)f=a_{R1} \cdot y \quad (2)$$

The following numerical formula (3) is derived from the numerical formulas (1) and (2).

If the distances $a_{L1}$ and $a_{R1}$ concerning the positions $L_1$ and $R_1$ of the focused images are detected, the distance y between the focusing lens pair and the object 51 can be calculated from the numerical formula (3).

$$y=B \cdot f/(a_{R1}+a_{L1}) \quad (3)$$

Now, the operations for detecting the foregoing distance y will be explained in detail with reference to FIG. 4.

Data 63L and 64R, represented by the solid curves in FIG. 4, of the left and right images are compared in a specific distance measuring range. If the compared image data is not identical to each other, the image data 63L of the left image is shifted to the right and the image data 64R of the right image is shifted to the left as described by the broken curves in FIG. 4 until the shift length $(a_{R1}+a_{L1})$, at which the data of the left image and the data of the right image almost coincide with each other, is detected.

The left and right image data 63L and 64R do not always coincide perfectly with each other, since the point at which the left and right image data 63L and 64R coincide with each other may be located in the gap between the picture elements of the optical sensor array 63 or 64.

The distance y between the object 51 and the focusing lens pair is calculated by the numerical formula (3) using the detected shift length $(a_{R1}+a_{L1})$.

For detecting the degree of coincidence of the left image data 63L and the right image data 64R, a specific range (window) is set on the data 63L and the data 64R.

Then, a first image data 71 and a second image data 72 are compared in the specific range as described in FIG. 5, and the area of the portions on which the first data 71 and the second data 72 do not overlap with each other (hatched areas in FIG. 5) is obtained.

Generally, this area is called an "evaluation function". The evaluation function is calculated for every specific range, in which the range of the image data (first image data or second image data) is shifted for one picture element length, i.e. one pitch of the picture elements constituting the optical sensor array.

In phase difference detection, it is judged that the same images are projected onto a specific range where the value of the evaluation function is minimum and least.

And, the distance of the object is calculated by finding an exact shift length $(a_{R1}+a_{L1})$ using the minimum and least value of the evaluation function and the values of the evaluation functions in two or three specific ranges adjacent to the specific range where the value of the evaluation function is the minimum and least.

When the contrast of the object is low or there exists unbalance of the light quantities between the first sensor array and the second sensor array (light quantity difference), the values of the evaluation function in the ranges adjacent to the specific rage where the value of the evaluation function is the minimum and least, become small.

Therefore, according to the conventional techniques, it is estimated that the contrast of the object is low and that the calculated distance data is not so reliable when the values of the evaluation function in the adjacent specific ranges are less than a certain reference value.

However, it is not enough to inspect the reliability of the calculated distance data based on the values of the evaluation function in the specific ranges adjacent to the specific range where the value of the evaluation function is the minimum and least. It has been found that, in some cases, that the reliability of the calculated distance data is low even when values of the evaluation function are large.

In view of the foregoing, it is an object of the invention to provide a method for measuring a distance which facilitates inspecting the reliability of the calculated distance data with high accuracy all the time when the values of the evaluation function in the specific ranges, adjacent to the specific range where the evaluation function takes the minimum and least value, are large.

SUMMARY OF THE INVENTION

According to an aspect of the invention, there is provided a method for measuring a distance, the method having the steps of finding an evaluation function indicating the degree of coincidence of a pair of image data projected onto a pair of sensor arrays through a pair of focusing lenses, and calculating the distance between the focusing lens pair and an object based on the evaluation function. The method comprises the steps of calculating a ratio of the valley value of a transition graph and the gradient of the transition graph using the minimum and least value of the evaluation function and two values of the evaluation function adjacent to the minimum and least value, and inspecting the reliability of the distance based on the ratio.

The reliability of the distance data is inspected based on the ratio calculated as described above.

According to another aspect of the invention, there is provided a method for measuring a distance, the method having the steps of finding an evaluation function indicating the degree of coincidence of a pair of image data projected onto a pair of sensor arrays through a pair of focusing lenses, and calculating the distance between the focusing lens pair and an object based on the evaluation function. The method comprises the steps of calculating a ratio of the valley value of a transition graph and the gradient of the transition graph using the minimum and least value of the evaluation function, two values of the evaluation function adjacent to the minimum and least value, and one more value of the evaluation function adjacent to either one of the two values; and inspecting the reliability of the distance based on the calculated ratio.

The reliability of the distance data is inspected based on the ratio calculated as described above.

DETAILED DESCRIPTION OF PREFERRED EMBODIMENTS

Figure 1A:
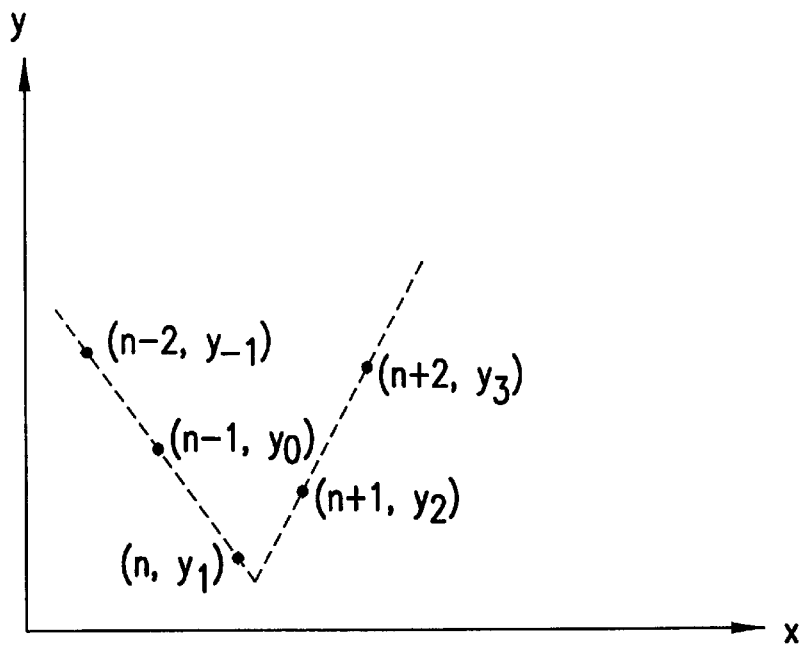
FIG. 1(a) is a transition graph connecting the values of the evaluation function found by shifting the specific range for every one picture-element length.
Figure 2A:
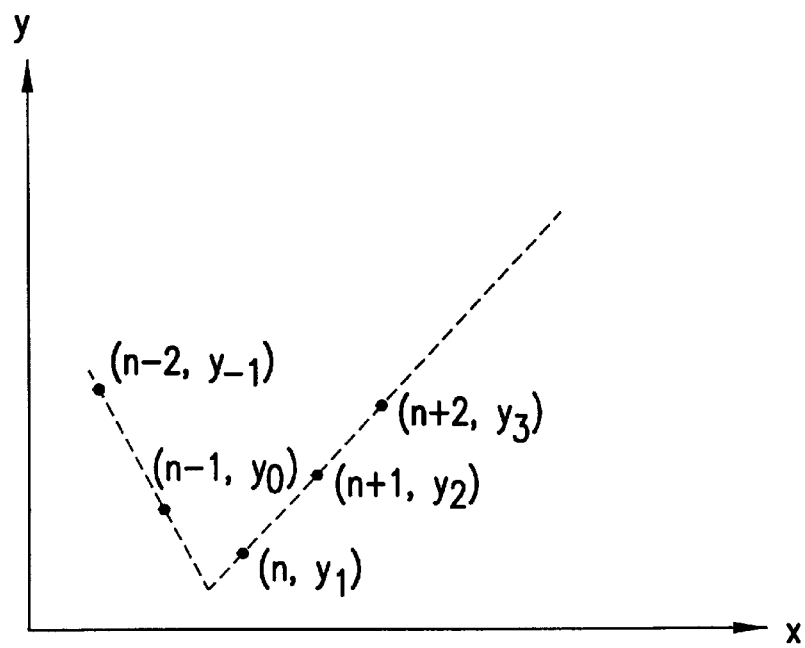
FIG. 2(a) is another transition graph connecting the values of the evaluation function found by shifting the specific range for every one picture-element length.

Now, the present invention will be explained hereinafter with reference to the accompanied drawings. FIG. 1(a) is a transition graph connecting values of the evaluation function obtained by shifting the specific range for every one picture-element length. FIG. 2(a) is another transition graph connecting values of the evaluation function obtained by shifting the specific range for every one picture-element length.

In these figures, parameter n represents an integer indicating the order of the evaluation function value. The parameter $y_1$ represents the minimum and least value of the evaluation function in the n-th specific range. The parameters $y_{-1}$, $y_0$, $y_2$ and $y_3$ represent the values of the evaluation function in the specific ranges adjacent to the n-th specific range where the value of the evaluation function is $y_1$. In FIG. 1(a), there is shown a case in which $y_0$ is larger than $y_2$. In FIG. 2(a), there is shown a case in which $y_0$ is equal to or less than $y_2$.

In a first embodiment, a ratio A of the valley value (value of the valley) of the transition graph and the gradient of the transition graph is calculated by using the following numerical formula (4) or (5).

In FIG. 1(a), for example, the valley value of the evaluation function is obtained at a cross point of the first line connecting the points (n−1, $y_0$) and (n, $y_1$), and the second line crossing the point (n+1, $y_2$) and having a gradient symmetrical, with respect to the Y-axis, to that of the first line.

In the first embodiment, the absolute gradient values of the first line connecting the points (n−1, $y_0$) and (n, $y_1$) and the second line connecting the points (n+1, $y_2$) and (n+2, $y_3$) are approximately or almost equal to each other.

$y_0 > Y_2$ $$A=(2y_1+y_2-y_0)/(y_0-y_1) \quad (4)$$

$y_0 \leq y_2$ $$A=(2y_1+y_0-y_2)/(y_2-y_1) \quad (5)$$

It has been found experimentally that the reliability of the distance data calculated by phase-difference detection is low irrespective of the values of the evaluation function adjacent to $y_1$ when the value A calculated by the numerical formula (4) or (5) is 1 or higher.

Figure 1B:
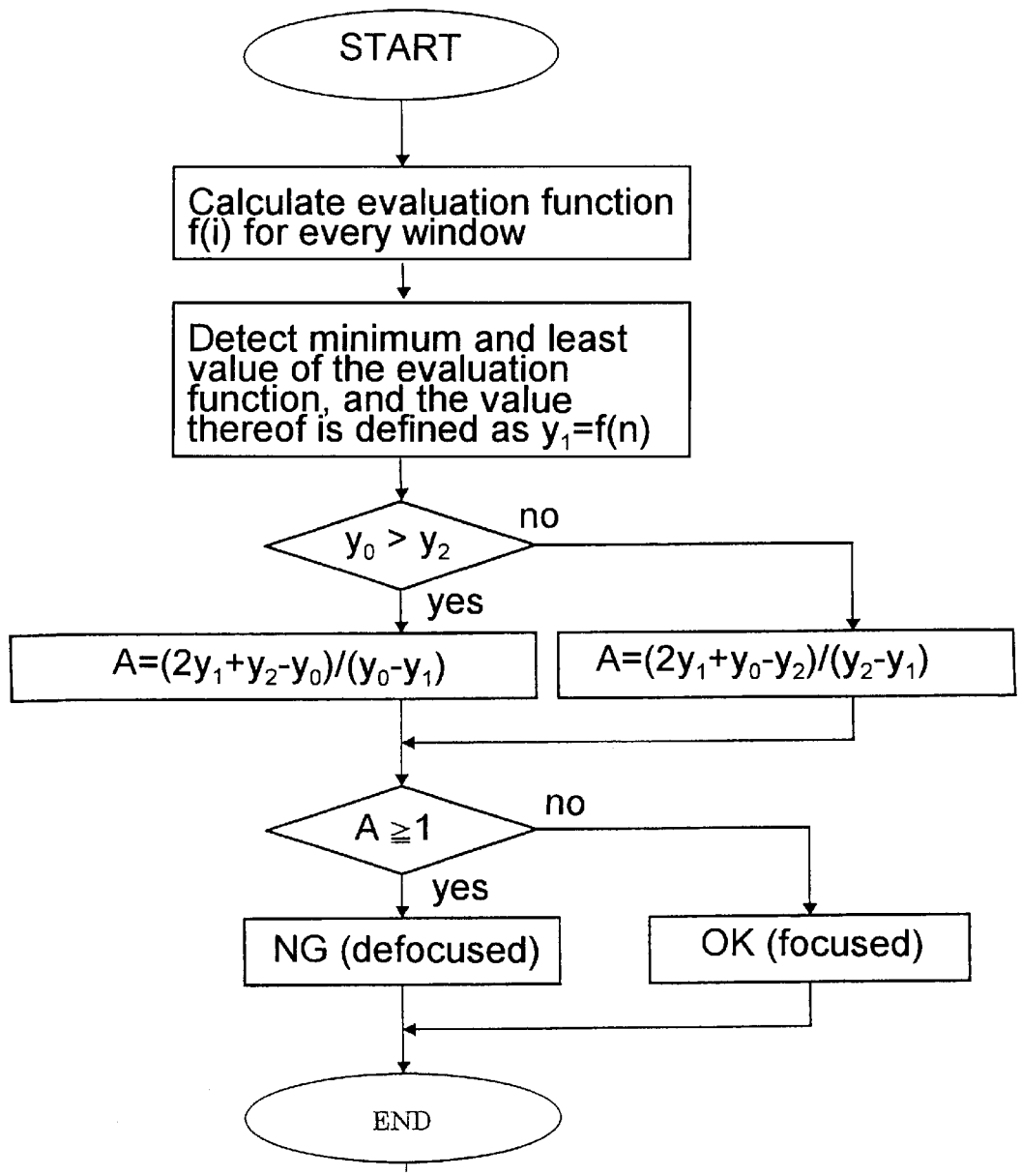
FIG. 1(b) is a flow chart for measuring a distance by using the transition graph of FIG. 1(a)

When the value A is 1 or higher, the image of the object is judged to be a defocused one, and the corresponding distance data is eliminated. FIG. 1(b) shows a flow chart for measuring the distance by using the transition graph of FIG. 1(a).

In a second embodiment, a ratio A' of the valley value (value of the valley) of the transition graph and the gradient of the transition graph is calculated by using the following numerical formula (6) or (7) which relates to $y_1$, $y_0$, $y_2$, and $y_3$ or $y_{-1}$. In the second embodiment, the valley value of the evaluation function is calculated based on the assumption that, for example in FIG. 2(a), the absolute value of the gradient of the first line connecting the points (n−1, $y_0$) and (n, $y_1$) and the absolute value of the gradient of the second line connecting the points (n+1, $y_2$) and (n+2, $y_3$) are different from each other.

In calculating A', the average of the absolute gradient values of the first and second lines is used for the gradient of the transition graph.

$y_0 > y_2$ $$A'=2(y_1y_3-3y_1y_2-y_0y_3+2y_0y_2)/(y_3-y_2-y_1+y_0)^2 \quad (6)$$

$y_0 \leq y_2$ $$A'=2(2y_1)_{-1}-3y_1y_0-y_2y_{-1}+2y_2y_0)/(y_2-y_1y_0+y_{-1})^2 \quad (7)$$

It has been found experimentally that the reliability of the distance data calculated by phase-difference detection is low irrespective of the values of the evaluation function adjacent to $y_1$ when the value A' calculated by the numerical formula (6) or (7) is 1 or higher.

Figure 2B:
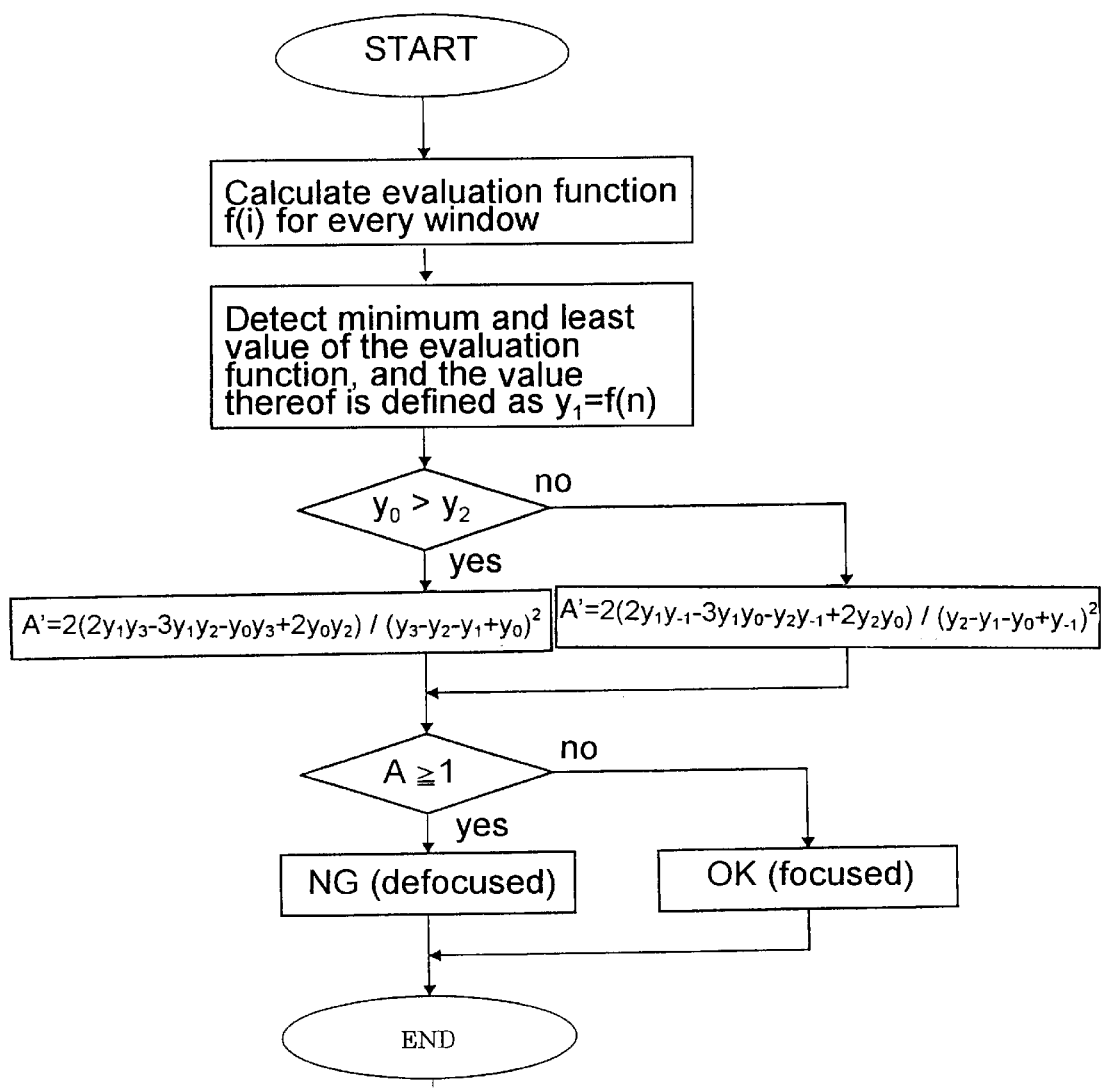
FIG. 2(b) is a flow chart for measuring a distance by using the transition graph of FIG. 2(a)
Figure 3:
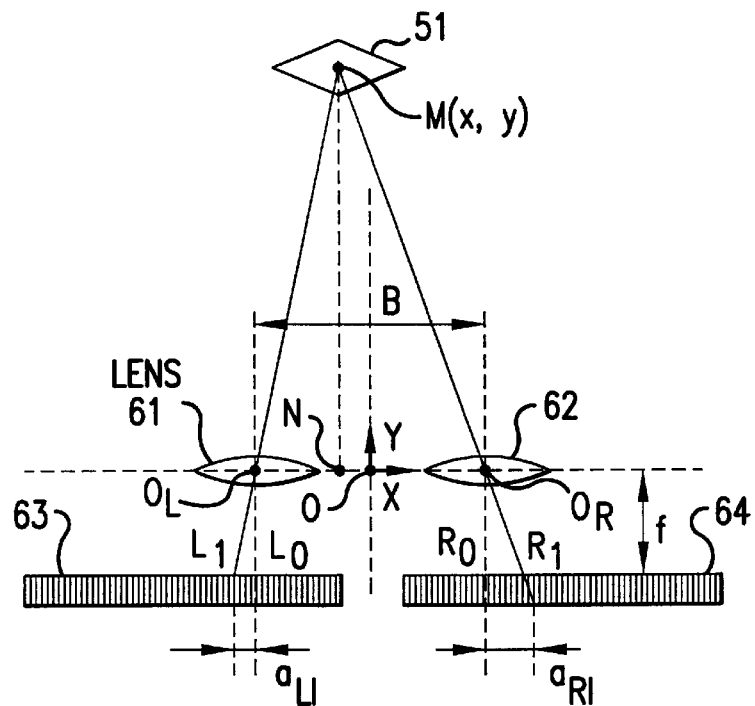
FIG. 3 is a schematic view for explaining the principle of measuring a distance.
Figure 4:
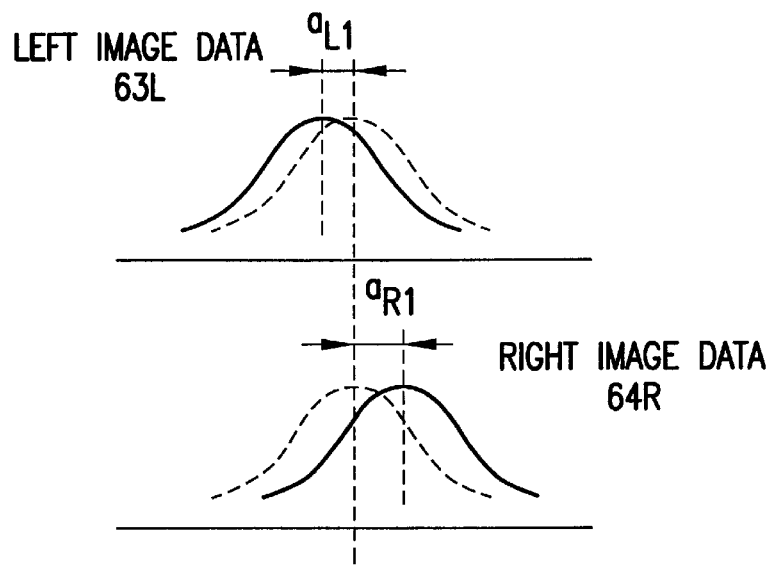
FIG. 4 shows a set of image data for explaining the principle of measuring a distance.
Figure 5:
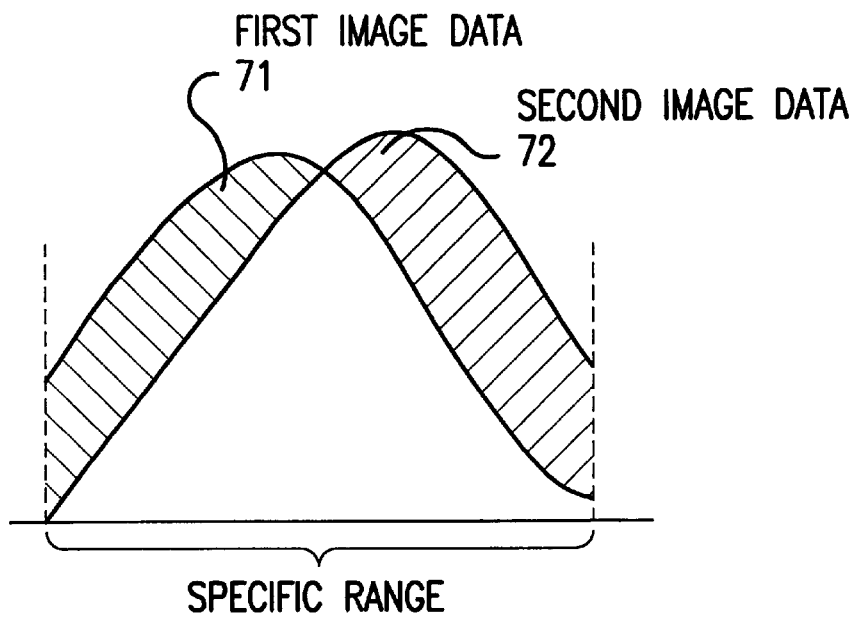
FIG. 5 shows a set of image data in a specific range for explaining the concept of the evaluation function.

When the value A' is 1 or higher, the image of the object is judged to be a defocused one, and the corresponding distance data is eliminated. FIG. 2(b) shows a flow chart for measuring the distance by using the transition graph of FIG. 2(a).

The functions of the evaluation function according to the invention will be considered below in connection with the case in which there exists an optical quantity difference between the left sensor array and the right sensor array.

Now the image data 63L on the left sensor array and the image data 63R on the right sensor array will be referred to respectively as L(k) and R(k) for the sake of convenience. Then, the minimum evaluation function fmin which takes the minimum value is expressed by the following numerical formula (8).

$$fmin = \sum_{k=0}^{n} |L(k) - R(k)| \tag{8}$$

When a light quantity difference a is caused between the left and right sensor arrays, the minimum evaluation function fmin' is expressed by the following numerical formula (9).

Figure 6:
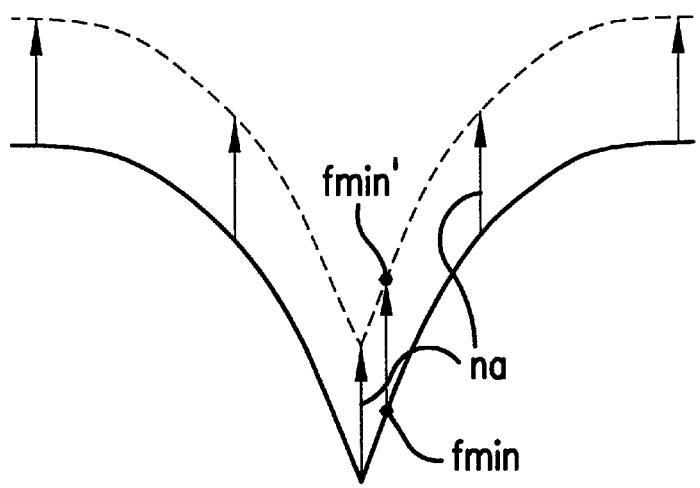
FIG. 6 shows a set of evaluation functions for explaining the offset thereof.

In other words, the evaluation function has an offset na as illustrated in FIG. 6.

$$fmin' = \sum_{k=0}^{n} |L(k) + a - R(k)| = fmin + na \tag{9}$$

Now the foregoing light quantity difference will be estimated hereinafter from the transition graph of the evaluation function.

Figure 7:
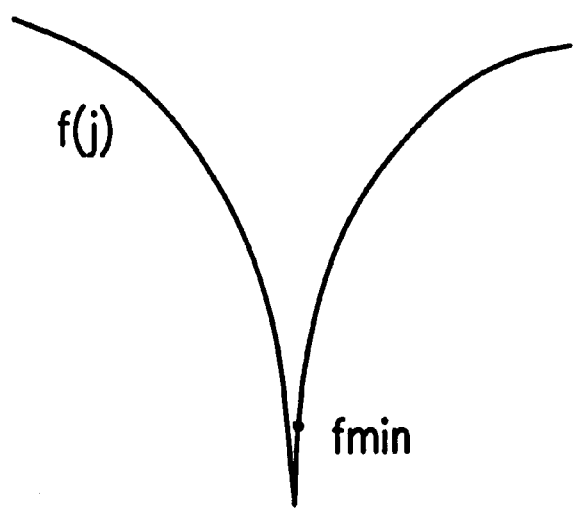
FIG. 7 shows the evaluation function of a high-contrast object.
Figure 8:
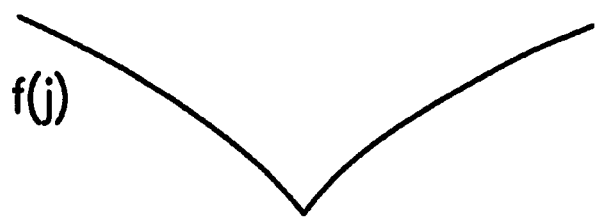
FIG. 8 shows the evaluation function of a low-contrast object.

FIG. 7 shows the evaluation function f(j) of a high-contrast object. And, FIG. 8 shows the evaluation function f(j) of a low-contrast object.

As these figures describe, the minimum evaluation function fmin is small (ideally zero) and the gradients thereof are large when the contrast of the object is high. The minimum evaluation function fmin is large and the gradients thereof are small when the contrast of the object is low.

When the contrast of the object is high, a large error is not caused in measuring the distance due to the highly reliable data of the evaluation function even when a light quantity difference is caused more or less. When the contrast of the object is low, the light quantity difference adversely affects greatly, and the reliability of the evaluation function data is low. Thus, the light quantity difference is troublesome when the contrast of the object is low.

Therefore, it is very useful and effective to find whether the contrast of the object is high or low when there exists a light quantity difference between the left and right sensor arrays. When a light quantity difference a is constant, it is possible to find whether the contrast of the object is high or low by calculating the ratio A of the foregoing numerical formula (4) or (5). When the ratio A is smaller than a reference value, 1.0 for example, it may be judged that the contrast of the object and, therefore, the reliability of the evaluation function are high. When the ratio A is equal to or larger than the reference value, it may be judged that the contrast of the object and the reliability of the evaluation function are low.

The ratio A may be deemed in the following manner.

A=Valley value of evaluation function/Gradient of transition graph≈Light quantity difference/Gradient of transition graph.

According to the invention, the reliability of the calculated distance data is evaluated with high accuracy.

What is claimed is:

1. A method for measuring a distance, comprising:

finding an evaluation function indicating a degree of coincidence of a pair of image data projected onto a pair of sensor arrays through a pair of focusing lenses, calculating a ratio of a valley value of a transition graph and a gradient of said transition graph by using a minimum and least value of said evaluation function and two values of said evaluation function adjacent to said minimum and least value, inspecting reliability of said minimum and least value of said evaluation function based on said calculated ratio, and calculating, if reliability is confirmed for the minimum and least value of said evaluation function, said distance between said focusing lens pair and an object based on said minimum and least value of said evaluation function.

2. A method for measuring a distance according to claim 1, wherein if the ratio of the valley value and the gradient is lower than a predetermined value, data of the calculated distance is deleted.

3. A method for measuring a distance, comprising:

finding an evaluation function indicating a degree of coincidence of a pair of image data projected onto a pair of sensor arrays through a pair of focusing lenses, calculating a ratio of a valley value of a transition graph and a gradient of said transition graph by using a minimum and least value of said evaluation function, two values of said evaluation function adjacent to said minimum and least value, and one more value of said evaluation function adjacent to either one of said two values, inspecting reliability of said minimum and least value of said evaluation function based on said calculated ratio, and calculating, if reliability is confirmed for the minimum and least value of said evaluation function, said distance between said focusing lens pair and an object based on said minimum and least value of said evaluation function.

4. A method for measuring a distance according to claim 3, wherein if the ratio of the valley value and the gradient is lower than a predetermined value, data of the calculated distance is deleted.

\* \* \* \* \*